United States Patent [19]
Turton-Smith et al.

[11] 3,754,447
[45] Aug. 28, 1973

[54] WHEEL BALANCING APPARATUS

[75] Inventors: Brian Turton-Smith; Trevor Edwin Clegg; John Stevens, all of London, England

[73] Assignee: Westinghouse Brake and Signal Company Limited, London, England

[22] Filed: June 1, 1971

[21] Appl. No.: 148,336

[30] Foreign Application Priority Data
June 18, 1970 Great Britain.................... 29,155/70
May 3, 1971 Great Britain.................... 12,685/71

[52] U.S. Cl..................................... 73/457, 73/466
[51] Int. Cl. ............................................ G01m 1/22
[58] Field of Search....................... 73/457, 466, 462

[56] References Cited
UNITED STATES PATENTS
2,712,232   7/1955   Pfeiffer................................. 73/466
3,076,342   2/1963   Hilgers................................. 73/462
3,164,994   1/1965   Merrill et al.......................... 73/457
3,461,729   8/1969   Haynes................................. 73/457

Primary Examiner—James J. Gill
Attorney—Larson, Taylor and Hinds

[57] ABSTRACT

In an on-the-car wheel balancer the wheel suspension is supported upon a jacking support which includes a force transducer, the wheel is rotated and the fundamental of the electrical signal produced by the transducer or a signal related thereto in a given manner, is utilized to produce a strobing pulse and an out-of-balance weight indication.

The fundamental due to wheel unbalance is cleared of noise due to suspension resonances by means of a tracking filter or preferably by means of a phase locking circuit which locks a multivibrator into the fundamental wheel frequency.

13 Claims, 7 Drawing Figures

WHEEL BALANCING APPARATUS

This invention relates to wheel balancing apparatus and relates more especially to wheel balancing apparatus suitable for use for balancing vehicle wheels whilst mounted on the vehicle.

According to the present invention there is provided wheel balancing apparatus which operates to test a wheel for unbalance whilst the wheel is being rotated to accentuated forces due to the unbalance, the apparatus including support means for rigidly supporting a wheel mounting carrying a rotatably mounted wheel to be tested and the support means including a force transducer operable to produce a wheel unbalance related cyclic signal.

The transducer may be so positioned that the wheel unbalance-related cyclic signal is a "static" unbalance signal and a second transducer being provided so positioned as to produce a second wheel unbalance-related cyclic signal indicative of "dynamic" unbalance. Static unbalance is a non-uniformity of mass distribution about the axle of a wheel such that the wheel tends, if free, to come to rest in a set position with the region of most mass moment downwards. Dynamic unbalance is a complex unbalance not only about its axle but also about some other axis which, when the wheel is rotating at an apreciable speed, can cause wheel shimmy or oscillation about a steering king-pin or like axis.

The or either said signal may be applied to control a phase locked oscillator, to produce a noise-free signal for operating stroboscopic or other means for indicating point of unbalance.

Alternatively, the or either said signal may be applied to a tracking filter operable to adjust the tuned frequency of the filter in accordance with the fundamental signal frequency to tend to eliminate noise accompanying the signal prior to utilisation in operating stroboscopic or other means for indicating point of unbalance.

In order that the present invention may be more clearly understood and readily carried into effect, the same will be further described by way of example with reference to the accompanying drawings in which, FIG. 5 illustrates a circuit arrangement of a strobing flasher for use with the circuit of FIG. 4, and FIGS. 6A and 6B illustrate the support means including a piezo electric crystal transducer for use with the circuit arrangement of FIG. 5, Before referring to the drawings, it will be understood that the fundamental proposal of the present invention is to employ an arrangement which senses fluctuations of a force signal derived from means rigidly supporting a rotating wheel to be balanced. In this context, "supporting" is intended to include literal support of a wheel and suspension (the mounting) or mere restraint of wheel motion about a king-pin say due to unbalance in rotation.

The wheel to be balanced is allowed to remain on the vehicle and the suspension of the vehicle is supported by a suitable jacking device such as a lever jack in such a way that the suspension system of the vehicle is compressed such that movement of the suspension during rotation of the wheel is minimal. A form of load cell, preferably a piezo-electric crystal cartridge is included in the supporting means and the output from the load cell is connected to a suitable electronic circuit for utilizing the waveform derived therefrom.

The use of a force dependent signal for wheel balancing has two particular advantageous features as compared with alternative systems which employ a signal from a displacement responsive sensor. The system can firstly be largely independent of the response characteristics of the vehicle suspension and secondly, phase error effects due to resonance of the vehicle suspension can be largely overcome.

Considering in general terms the question of unbalance of a rotating body, an unbalanced mass in a rotating body such as a car wheel produces a speed-dependent rotating radial force. In a vehicle suspension system this rotating force acts as a cyclically varying force on one or more axes about which movement is possible and gives rise to a vibrational effect. The force varies in proportion to the square of the speed and the frequency varies directly as the speed, added to which most vehicle suspensions have a degree of resonance within their working range.

In an on-vehicle wheel balancing method which permits movement of the vehicle suspension, in addition to the unknown response of the suspension, effects due to damping and resonance of the suspension can give rise to unreliability in a system which produces meter indications and synchronisation for indication of the position of out-of-balance. A phase error can occur moreover between the disturbing force and the movement of the suspension, this error varying and theoretically passing through zero at a frequency of resonance between unbalance and response.

As indicated above, effects such as mentioned due to permitted movement of the vehicle suspension, can be overcome by to a large extent preventing such movement and thereby reducing the effects to the level of noise against a fundamental unbalance signal frequency.

Figure 1:
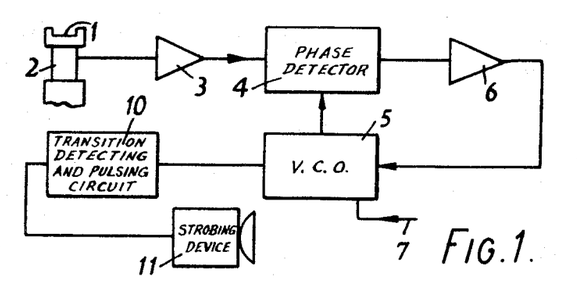
FIG. 1 illustrates in block schematic form part of a wheel balancing apparatus in accordance with the invention.

Referring to FIG.1, a wheel to be balanced on a vehicle is selected and a suitable point beneath the wheel suspension is jacked up to lift the wheel from the ground, and lowered onto a supporting head denoted by reference 1. Beneath the supporting head there is a piezo electric crystal load cell denoted by reference 2 and the output of this load cell is connected to an amplifier 3 having an output connected to a phase difference detector represented by block 4. The phase difference detector 4 has a second input from a voltage controlled oscillator represented by block 5 the frequency of which is controlled by a damped d.c. output derived from an amplifier 6 connected to the output of the phase difference detector. The voltage controlled oscillator 5 consists essentially of a multi-vibrator, the output voltage amplitude of which is controllable by a resistive level control at the input 7. Any difference in phasing between the output of the voltage controlled oscillator and the output of amplifier 3 is detected and forms the input to the damped d.c. amplifier 6 and a consequent variation in the range of say 0 to 10 volts of the control input to the oscillator 5 acts in a sense to pull the oscillator into phase locking with the input signal fundamental.

Figure 2:
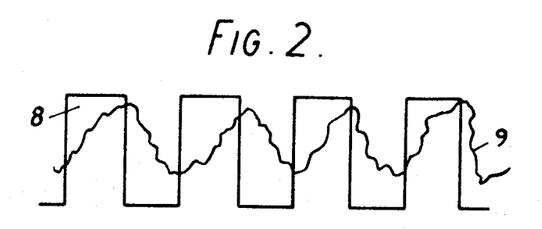
FIG. 2 illustrates waveforms to be referred to with reference to FIG. 1.

Referring to FIG.2, the relationship of the oscillator output represented by the waveform 8 to the output signal from the amplifier 3, represented by 9 is shown, the waveform peaks coinciding with transitions in the square wave 8. The rectangular waveform derived from oscillator 5 is applied to a transition detecting and pulsing circuit represented by block 10 and pulses derived from 10 are applied to a light flashing strobing device 11 which is arranged adjacent the wheel to be balanced to enable the position at which balance weights are required to be applied, to be identified.

The amplitude of the waveform 9 is sensed by further circuit means and utilised to provide an output signal amplitude indication, calibration of which can be provided for indicating the magnitude of balance weights required.

The apparatus described with reference to FIG.1 is assumed to be operated by running the wheel to be tested up to a predetermined speed corresponding to say 60 to 80 m.p.h. and then allowing the wheel to decelerate freely under its own momentum whilst the test is being applied. For the purposes of running the wheel up to speed, an electric motor may be provided for driving a spinner which is manually engagable with the wheel. The spinner is incorporated in a strobe unit and electronic system case for convenient operation by the user, the case having electrical flexible connection with the support means.

Apparatus as outlined above with reference to FIG.1 will now be described in greater detail with reference to the preferred circuit embodiment of FIG.4 of the drawings.

Figure 4:
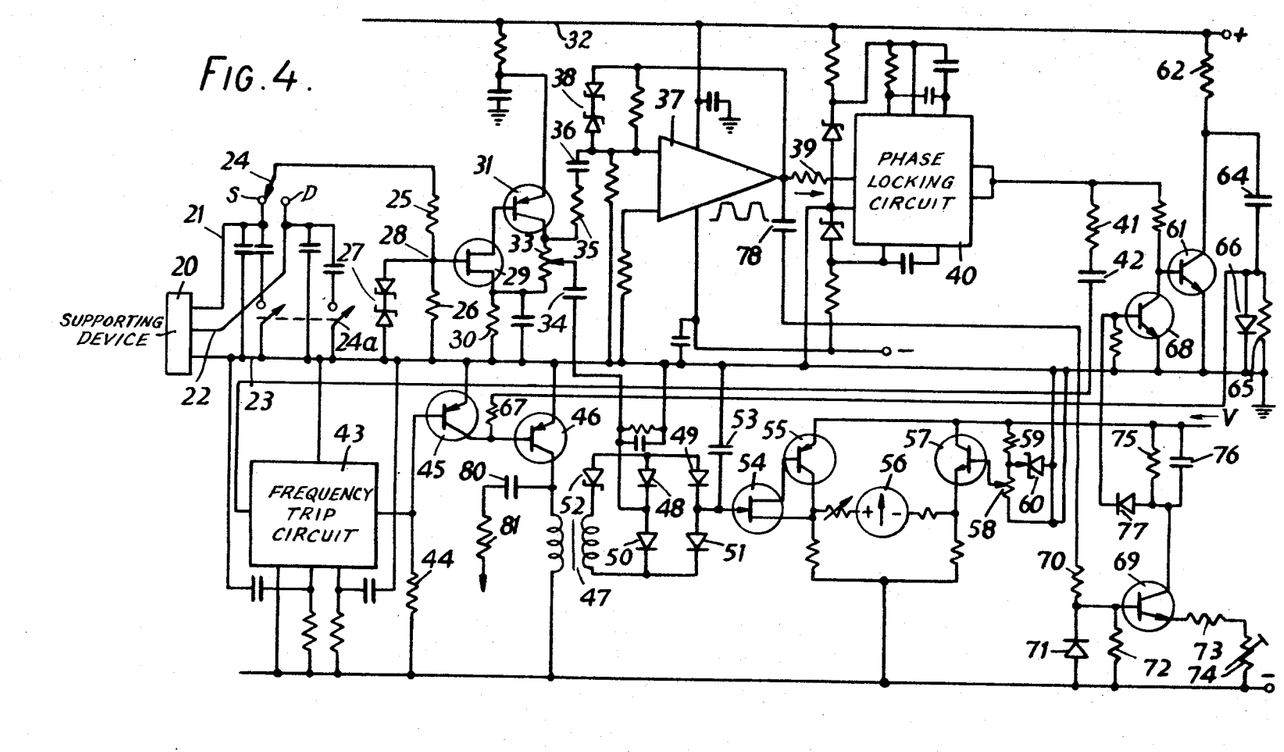
FIG. 4 illustrates an electronic circuit arrangement for a preferred embodiment of the invention as outlined in FIG. 1.

Referring to FIG.4 of the drawings, a supporting device for the suspension of a wheel to be balanced is represented by the block reference 20 and this has two outputs denoted by 21 and 22 from respective piezo electric crystals. The crystal connected to the terminal 21 is a "static" balance crystal and that connected to the terminal 22 is a "dynamic" balance crystal. These crystals are essentially voltage sources and are connected to the contacts of a switch 24 which is maually selectably settable to one of two positions for static or dynamic balancing procedure. The two positions of the switch are denoted S and D as shown. Capacitive loading of terminals S and D is provided as shown and a choice of two values thereof is selectable by switch 24a. The output from the switch 24 is connected across a potential divider provided by resistors 25 and 26 and a pair of zener diodes 27 are connected in series across the potential divider resistor 26 to limit the voltage which can appear at the point 28 of the potential divider to a maximum of about 3 volts. The point 28 is connected to the emitter electrode of a field effect transistor 29 which presents a high impedance to the preceding circuit. One base of 29 is connected via a resistor 30 to ground and the other base is connected to the base electrode of a transistor 31 the emitter electrode of which is connected via decoupling components to a main circuit supply positive line 32 and the collector electrode is connected via a resistor 33 to the aforementioned one base electrode of the field effect transistor 29. The resistor 33 serves also as a variable potentiometer tap-off which provides a.c. coupling via a coupling capacitor 34 to the sampling and holding part of the circuit to be referred to hereafter. Further, the collector electrode of the transistor 31 is connected via a series resistor 35 and capacitor 36 of one input to an operational amplifier type 709 C denoted by the block 37 which is provided with two zener diodes 38 in a feed-back path thereof which limits the gain of the amplifier for high levels of input signal. As will be seen hereafter, the amplifier 37 operates as a clipping amplifier to produce a flat-topped output waveform via a series resistor 39 to a commercially available integrated circuit NE565 A type phase locking circuit represented by the block 40. The circuit of block 40 is a phase locking circuit which includes an oscillator, typically a multivibrator, and which operates to lock the frequency of oscillation of the multivibrator into a 90° phase relationship with the fundamental of the incoming waveform at the input to circuit 40. The output from the circuit 40 which is a virtually noise-free signal, is fed via a series resistor 41 and coupling capacitor 42 to an input of a frequency trip circuit represented by the block 43. The block 43 is again a commercially available frequency selective trip circuit type FX101 as marketed by Consumer Microcircuits Limited and in this case it is arranged to "trip" when the frequency of the signal derived from the circuit 40 is within a predetermined band of frequencies corresponding typically to a wheel speed selected within the range of 600 to 1,200 r.p.m. The trip output from the circuit 43 is applied across an output resistor represented by reference 44 and appears at the base electrode of a transistor 45, the emitter electrode of which is connected to ground and the collector electrode of which is connected to the base circuit of a further transistor 46 the emitter of which is grounded and the collector of which is connected via the primary winding of a pulsing transformer 47, the secondary winding of which is connected to a sample and hold circuit which includes an arrangement of diodes 48, 49, 50 and 51, a zener diode 52 and a hold capacitor 53.

The charge on the capacitor 53 is representative of peak volts derived in operation via the capacitor 34 via the transistor 31 referred to above and therefore indicative of the amount of unbalance. The voltage on the capacitor 53 appears at the emitter electrode of a field effect transistor 54 which is provided to present a high impedance to the sample and hold circuit. The bases of this transistor are connected to base and collector of a further transistor 55 arranged to present a low impedance input to one side of a milliammeter denoted by reference 56 and having suitable series calibration resistances; the other side of the milliammeter being fed from a further emitter follower transistor 57. The base electrode of transistor 57 is connected to a tapping point on a resistor 58 in a circuit network comprising resistors 58, 59 and zener diode 60 to derive a stabilised reference from the supply positive line.

The circuit thus far described enables sampling of wheel unbalance magnitude to be effective at a wheel speed or band of speeds determined by the frequency trip circuit 43. In order to establish the point of unbalance, a further output is derived from the phase locking circuit 40 and this is applied to the base electrode of a transistor 61 the collector of which is connected via a resistor 62 to the positive supply line and the emitter of which is connected to the circuit ground line. The output of the transistor 61 is derived at the collector thereof and applied to a differentiating circuit comprising a capacitor 64, a resistor 65 and a small clipping diode 66. The differentiated negative going pulses derived from the anode of the diode 66 are applied via a resistor 67 to the base electrode of transistor 46. This transistor operates to supply gating pulses to the sample and hold circuit in the event firstly of pulses being present via the resistor 67 and secondly of the transistor 45 being in the locking condition such as to not clamp the base electrode of 46 to the circuit ground line. A further gating transistor is represented by the reference 68 and this is connected between the base electrode on the above mentioned transistor 61 and ground in order to short out any inputs to the base electrode when no signal is present. The transistor 68 has a driving circuit comprising a further transistor 69 with associated components 70 to 77 as shown and which applies a base drive to the transistor 68 when the transistor 69 is off, due to the absence of a signal at the output of the operational amplifier 37, as sensed via the a.c. coupling capacitor 78. Thus only when there are significant output volts from the amplifier 37, are differentiated pulses allowed to be passed to the sample and hold circuit or the flasher connected via 80 and 81 to transistor 46. Also, pulses are only derived from transistor 46 in the event of the wheel speed being within the acceptance band of the frequency trip circuit 43 referred to above when 43 draws current from the junction of the base of 45 and resistor 44. The flasher circuit is now to be described with reference to FIG.5.

Figure 5:
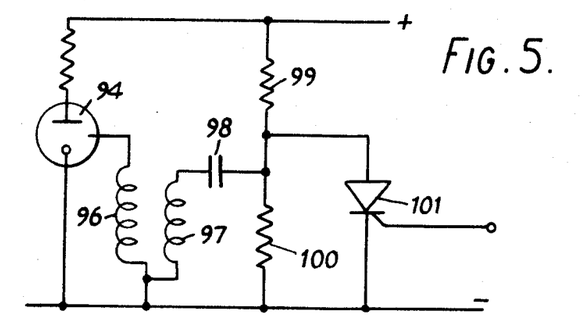

Referring to FIG.5, a d.c. power supply (not shown) is connected to charge a capacitor (not shown) through a resistor (not shown). The voltage on the capacitor thus appears across a flasher tube which is of commerically available type and is denoted by the reference 94. The cathode of the tube 94 is connected to ground. The tube 94 has a gate electrode connected as shown to the secondary winding 96 of a gate pulsing transformer the primary winding 97 of which is coupled via a coupling capacitor 98 to the junction between a pair of resistors 99 and 100. Across the resistor 100 there is connected a thyristor 101 the triggering electrode of which is connected to the resistor 81 referred to above with reference to FIG.4.

Whilst not specifically referred to, a number of other specified peripheral components inter-connecting the various terminals of the integrated circuit blocks 37, 40 and 43 are provided as necessary.

Referring now more particularly to the operation of the arrangement described above with reference to FIG.4, the suspension of the vehicle wheel to be balanced is lowered onto the jacking support 20 which includes the piezo electric crystal voltage generating device and the apparatus which has built into it an electric motor-driven spinner, is moved up against the freely rotatable wheel. The wheel is therefore accelerated up to a speed which is greater than that corresponding to the acceptance frequency of the apparatus and determined by the frequency trip circuit 43. This is indicated by a spinner revolutions per minute indication on the dial of the apparatus and requires no further discussion. Assuming that the switch 24 is in the position shown, the piezo electric crystal mounted in the jacking support 20 operates a produce a cyclic output voltage the frequency of the fundamental of which is dependent upon the speed of rotation of the wheel and the magnitude of the voltage is dependent upon the magnitude of the out-of-balance of the wheel being tested. Switch 24a which has two movable contacts, is settable to connect across the output of 20 an adjustable magnitude of capacitor such as to adjust the magnitude of the output of 20 by a factor of 10 to suitably adjust the proportionality of the output which is eventually to be read on the meter 56 to indicate the degree of unbalance. Clearly, a small degree of unbalance will be more accurately read from the meter 56 with the switch 24a in a position as shown in the drawing.

The signal derived via the switch 24, in general includes considerable noise components due to the characteristics of the vehicle suspension which change from vehicle to vehicle.

The signal is fed via the high impedance presented by the field effect transistor 29 to produce a signal derived from the collector resistor 33 via the capacitor 34 to be made available to the sample and hold circuit referred to above across the junctions of diodes 48, 50 and 49, 51 respectively. It will be appreciated however that in general, at this time no signal is stored in the hold capacitor 53 since the diodes are not in the conducting condition.

The amplified but generally noisy a.c. signal which is present at the collector electrode of the transistor 31 is also applied to the operational amplifier 37 and as explained previously the output of this amplifier is a clipped waveform which appears via the resistor 39 at the input to the phase locking circuit 40. The circuit 40 therefore produces an output signal frequency which is substantially free of the noise referred to and which is displaced in phase by 90° in relation to the incoming fundamental frequency derived from the wheel support 20. It will be appreciated therefore that the signal appearing at the output of 40 is a square wave which has transitions more or less precisely at the positions of the peaks of the fundamental of the incoming wave.

Thus the signal which appears at the collector electrode of transistor 61 is a signal which has transitions at the peaks of the fundamental frequency of the wheel. By differentiating this signal in the differentiating circuit and applying the differentiated negative going pulses which appear across the diode 66, via the resistor 67 to the base electrode of the transistor 46, resultant pulses appear in the collector circuit of transistor 46 which are utilised to actuate the flasher circuit referred to above via the capacitor 80 and resistor 81. Hence the flasher can flash at instants corresponding to the peaks of the wheel oscillation frequency. Such flashes illuminate the wheel in a position which determines the point at which balance weights are to be applied for the purposes of correcting the static unbalance. Normally the point at which the weight is to be applied is at 90° to the vertical in the illuminated position of the wheel.

As mentioned above, the operation of the transistor 61 is governed by the existence of a certain magnitude of signal at the output of the amplifier 37. This is determined by the transistor 69 the base of which receives an output signal proportional to the output of the amplifier 37 and which renders the transistor 68 non-conducting when such a signal is present so that the signal appearing at the base of 61 is not shorted out under these conditions. Additionally, the operation of the transistor 46 is conditional upon the frequency trip circuit 43 drawing current from the junction between the resistor 44 and the base electrode of the transistor 45. Under these conditions, the transistor 45 is non-conducting which enables the transistor 46 to operate only under conditions where the signal applied from the phase locking circuit 40 to 43 is within the acceptance band of the frequency trip circuit 43. It will be appreciated therefore that in the present circuit arrangement, pulses are only applied to the flasher on the one hand and as a gating input via the transistor 46, to the sample and hold circuit only when the wheel speed is running through the acceptance frequency band of the frequency trip circuit 43.

Referring to the trip circuit, by applying pulses via the pulse transformer 47, the zener diode 52 is rendered conducting to cause the diodes 48, 49, 50 and 51 to be in the conducting condition such that a low impedance current path is provided between the capacitor 34 and the capacitor 53. Under these conditions, the capacitor 53 charges to the peak value of the signal derived via the capacitor 34. After 53 has been thus charged, its voltage is presented to the therefore impedance input of the field effect transistor 54 and hterefore the charge on 53 is held for a substantial period of time without altering. This enables a steady indication to be presented on the meter 56 indicative of the unbalance weight which is required to be applied to the wheel. Further, although not shown in the drawing, a suitable discharge switch is normally provided across the capacitor 53 to enable the operator to cancel the existing indication on meter 56 before commencing to seek a further indication either on the same wheel or on a freshly mounted wheel.

Although not shown in the drawings, it is often desirable to enable balancing operations to be effected in response to readings taken from wheels running through different frequency bands. For this purpose, it may be desirable to include a suitable further switch for selecting the frequency bands which the apparatus is required to accept for given types of vehicle wheel and suspension combinations. For this purpose, the further switch may operate to switch in and out selectively further capacitive components associated with the frequency trip circuit in accordance with the suppliers recommendations and also since the phase locking of the circuit 40 is a variable which is required to be adjusted, a further set of contacts on the same further selector switch may be provided to switch in and out appropriate trimming resistors in the phase locking loop of the phase locking circuit 40. These are details which will be readily apparent to engineers skilled in the art and are mentioned here merely for the sake of completeness.

Referring briefly to the meter circuit which provides a steady indication on the meter 56 of the magnitude of signals stored on the capacitor 53, it will be appreciated that the collector of transistor 55 and the emitter of transistor 57 present a low impedance output to the meter 56 which is typically a milliampmeter. Adjustment for zero is provided by the movable contact on resistor 58 and the zener diode 60 provides for stabilization of the supply to the meter such as to prevent flickering and enable a steady indication to be provided.

As already discussed with reference to FIG.4, the transistors 61 68 and 69 can be regarded as included in conditioning means which require that a plurality of voltages are within prescribed limits, as a condition of out-of-balance weight and/or out-of-balance position indication. Correctness of the indicated out-of-balance weight and/or an out-of-balance indication is therefore more surely guaranteed. The voltages concerned are the oscillator control voltage, which ensures that the oscillator frequency is within the desired system acceptance frequency range, the transducer signal level to ensure that signals are present as opposed to mere transients or noise components and finally the phase detector output voltage to insure firstly frequency and secondly phase tracking.

Again, as already described, with reference to FIG.4, the indicating meter circuit may be arranged to sample and hold an indication so that the meter reading can be displayed for a period of time after the wheel being tested has finished spinning. This permits the operator to postpone attending to the magnitude of the out-of-balance reading until further attention has been given to the point at which unbalance correction is to be applied. Whilst in the electronic circuit described above with reference to FIG. 4, the sample and hold means enables the magnitude of unbalance to be sensed only in a given acceptance band of wheel speeds, it will be appreciated in general that if alternatively sensing is to be effected over the whole spectrum of frequencies of run-down of the wheel, means may be desired for compensating for the inverse square law which governs the relationship between signal magnitude and wheel speed. In order to achieve an approximately steady meter reading of unbalance weight under these conditions, it is possible to employ two single pole low-pass resistor capacitive networks isolated from each other by means of a suitable buffer amplifier. The resistive and capacitive combinations are so chosen that the inverse frequency term in the overall response of the circuit is negligible as compared to the inverse square law term. The apparatus may include a meter circuit employing a linear detector and the meter and the rectifying element thereof are incorporated in the feed-back circuit of a high gain amplifier.

Figure 6A:
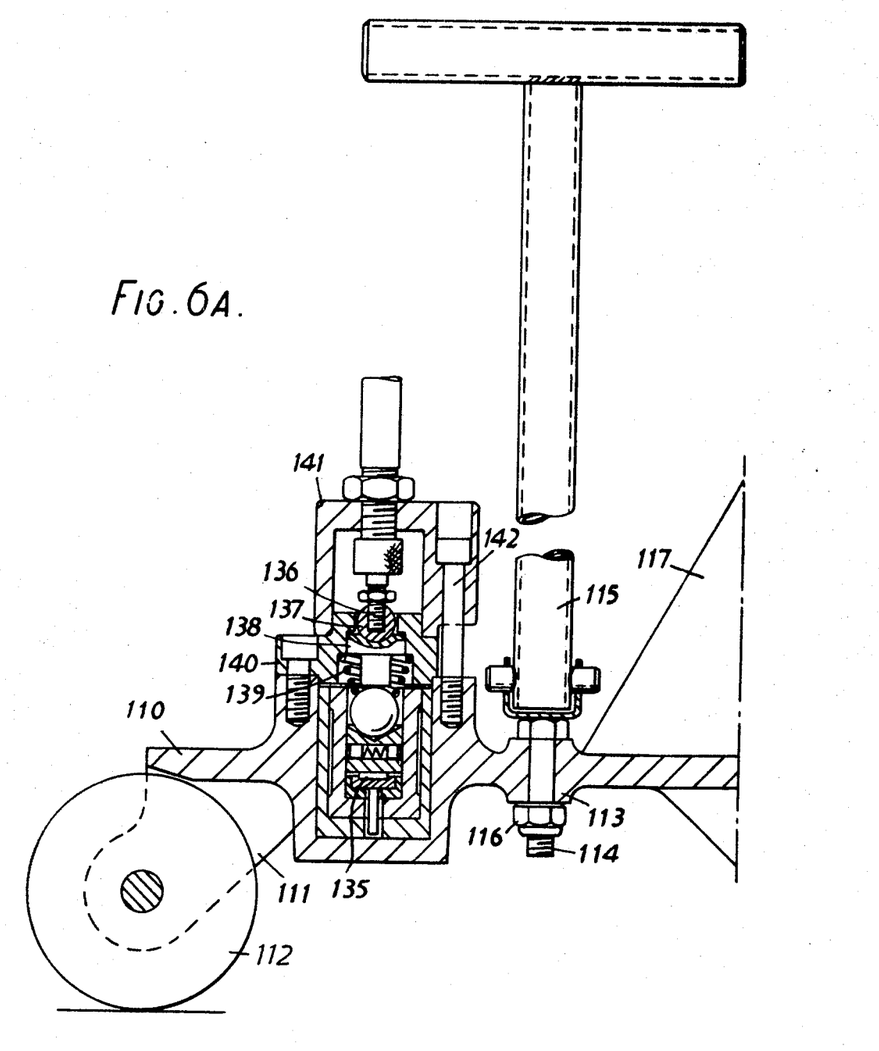
Figure 6B:
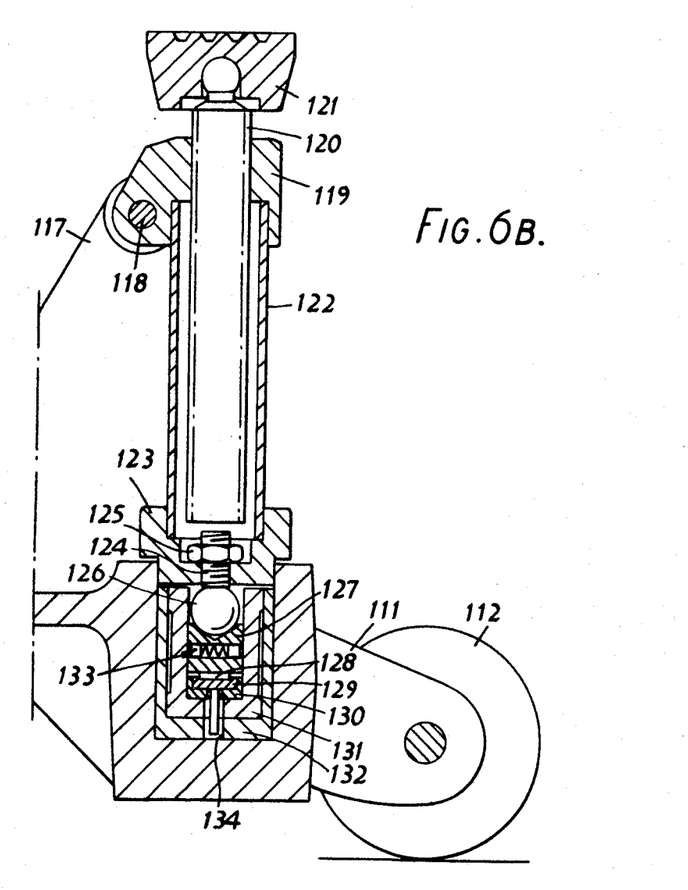

Hitherto, no description has been given of the support means which is denoted by reference 20 in the circuit arrangement of FIG.4. Referring therefore to FIG. 6A and FIG. 6B together, the support means comprises a cast iron base part referenced 110 supported on three legs denoted generally by references 111, these legs carrying wheels 112. In the centre of the base part, there is a boss 113 through which the spindle 114 of a pivoted T-handle 115 is retained vertically by means of the nut 116. It will be appreciated that this handle enables the device to be readily positioned beneath the suspension of a vehicle wheel. The device further has a vertical web 117 the upper part of which carries a drilling through which a pin 118 passes to support in a vertical position, the nut 119 having a screw pillar 120 and a ball-mounted support head 121. The nut of the screw jack is carried upon a tube 122 which is fixed within a jack base part 123. The base part is vertically movable within the casting of the base of the device. Within the part 123 there is a threaded stud 124 with a locking nut 125. The lower end of the stud 124 rests upon a steel ball 126, which in turn rests in a recess in a cylindrical brass contact member 127. The brass contact member bears vertically upon the upper surface of a piezo electric crystal 128 which in this case is the crystal which produces the signal indicative of static unbalance. The crystal 128 is supported upon a further brass contact piece 129 which itself rests within an insulating cup 130. The whole is slidably movable within the outer brass cup 131 which is mounted within an insulated liner 132 in the casting. A horizontal drilling within the brass contact member 127 carries a pair of outwardly spring-loaded slidable slugs 133 for the purposes of ensuring good electrical contact between the contact member 127, and the cup 131 within which 127 is slidable. Electrical leads from the piezo-electric crystal are brought out via a suitable passage through the members 130, 131 and 132 this being denoted by reference 134.

Referring now to the piezo-electric crystal which is denoted by reference 135, and which is utilised to provide the electrical signal indicative of dynamic unbalance, this crystal is screwed in an exactly similar arrangement to the crystal 128 and will not be described in greater detail. However, the arrangement above the ball which loads the crystal is slightly different in that in this case it is loaded via a co-axial mechanical cable linkage one end 136 of which is indicated. This engages via a ball 137 with a socket 138 a stud on the lower side of the socket resting upon the previously mentioned ball. Additionally, the ball is suitably spring loaded by a spring 139 captive within a housing member 140 bolted to the casting. A further housing member 141 is provided into which the mechanical co-axial linkage is screwed and which is itself screwed to the casting by means of screws one of which is shown as 142.

As far as the operation of the arrangement of FIG.6 is concerned, it is first to be noted that the pin 118 rests within a machined hole in the web 117 which permits a certain degree of vertical movement of the nut 119, tube 122 and its lower part 133 relative to the casting. Further, a preloading adjustment of the crystal can be effected by adjusting of the screw member 124 within 123 and tightening the lock nut 125. Under such preloading, clearly the jack nut will rest in its uppermost position relative to the web 117. On lowering of the vehicle suspension onto the jacking head 121 after suitable adjustment of the jacking screw 120, upward thrust will be removed from the pin 118 the preloading stress being at least partly counteracted by the vehicle load on the jack support head 121. Forces due to the rotating unbalanced wheel then give rise to the desired cyclic voltage signal on the crystal 128.

For the purposes of dynamic balance, the outer end of the mechanical co-axial linkage 136, is clamped to a back plate or member of the vehicle suspension and thereby transmits out-of-balance forces due to dynamic unbalance via the cable 136 to the crystal 135 to cause crystal 135 to generate at the same time as the static unbalance signal on 134, a dynamic unbalance electric signal. During run-down of the vehicle wheel therefore the operator can readily operate the switch 24a to transfer the circuit of FIG.4 from a static unbalance reading to dynamic unbalance reading after having first effected cancellation of the first reading on meter 56 as previously discussed.

Figure 3:
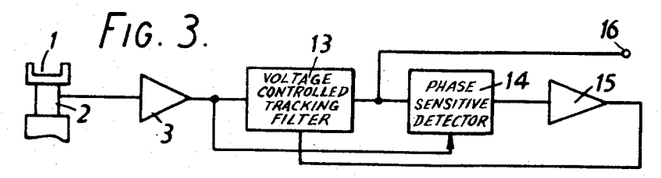
FIG. 3 illustrates an alternative form of part of an apparatus in accordance with the invention.

An alternative arrangement employing the invention is illustrated in block form in FIG.3, where the support means 1 and the transducer 2 are the same, feeding an output signal derived as a result of an out-of-balance rotating wheel, to an amplifier 3. The amplified signal derived from 3 is therefore the cyclic wheel unbalance related signal and it is applied to a voltage controlled tracking filter represented by block 13 a quadrature output from which is applied to a phase difference detector 14, a second input to which is derived directly from the output of the amplifier 3. The output from the phase difference detector is applied to a damped d.c. amplifier 15 the output voltage of which controls the tuned frequency of the filter 13. The filtered output corresponding to the fundamental of the input signal derived from 3, is derived from the output of the voltage controlled filter 13 at the terminal 16. The tracking filter circuit operates by virtue of the voltage controlled filter generating a phase shift which varies with the input signal frequency and the phase difference detector compares the phases of the input and output to give a d.c. output signal to control the frequency of the tuned filter to pull the phase shift into line in order that the tuned frequency shall correspond with the input signal fundamental frequency. The output signal derived from the terminal 16 is therefore a cyclically fluctuating signal corresponding in frequency to the fundamental of the signal derived from the transducer 8, but without the noise components due to resonances, etc., in the suspension and the mounting of the wheel.

AS in the case of FIG.1, the a.c. waveform derived from the filter of FIG.3 can be utilised in a circuit similar to that of FIG. 4, on the one hand to provide an indication of the magnitude of balance weight required and by producing a pulse waveform at given transitions of the waveform, to operate a flasher to enable the position at which suitable balance weights have to be applied to the wheel to correct for unbalance.

A further, but less attractive method of utilising a force-dependent cyclically fluctuating signal is to employ a relatively narrow fixed frequency filter to pass the signal frequency over a possibly restricted, range of wheel speeds and to reject all noise frequencies outside the filter band. In such a case, it would again be arranged that the wheel could be permitted to run down through the filter frequency band and the unbalance is sensed by the strobing mechanism during the brief period when the wheel speed is passing through the said narrow band of frequencies. A waveform clipping circuit and a frequency trip circuit similar to that used in FIG.4 may again be employed.

It will be appreciated that in general high rotational wheel speeds in wheel balance testing are undesirable if a wheel can be balanced satisfactorily by rotating it at a low speed. The absence of any necessity with a low speed of rotation, to deal with questions of resonances in the suspension to which a vehicle mounted wheel is attached leaves the only restriction of speed as being that it shall be high enough to give sufficient accentuation of unbalance to produce an adequate signal to noise level in the sensing system when relatively small amounts of unbalance are present. Where the force transducer is arranged to produce a sufficient signal to enable small amounts of unbalance to be detected at such relatively low speeds, means may be provided for directly projecting a mark onto the rotating wheel to be balanced to indicate the position in which corrective weights are to be applied. Such direct marking can take the form of the projection of a dye or marker to the tyre or alternatively a photo-sensitive strip can be applied to the tyre against which a repetitive light beam is directed to provide a recorded photographic marking.

As indicated in the previous paragraph, one of the difficulties in a wheel balancing system which operates with a cyclically fluctuating force signal as in the present invention or with a signal produced, for example, by wheel vibration, is that loss of the signal tends to occur as a balanced condition is approached. Accordingly balancing apparatus may be arranged to enable the fitting to the wheel of a known unbalance mass and to carry out balancing procedures until the indicated unbalance coincides with magnitude and position with the known mass. The known mass is then removed to leave a balanced wheel. Clearly in balancing apparatus designed so that such a procedure could be practised, meter indication offsets to allow for the application of predetermined unbalance weights on certain diameter wheels can readily be built in to the apparatus.

Whilst in the foregoing arrangements, it is assumed that jacking support means is placed beneath the vehicle suspension and that the force signal is derived from beneath such a support, it will be understood that such an arrangement may merely provide for the sensing of "static" unbalance by measurement of substantially vertically acting cyclic unbalance forces. The jacking and support means can incorporate further transducers which can be arranged to be located against a part of the system which is normally rotatable in a horizontal plane, to provide indications of twisting moments due to "dynamic" unbalance. A suitable position for locating such transducers would be against the brake backplate, for example. Similar circuits and marking systems may be employed to those described previously, for sensing the magnitude and position of dynamic unbalance.

A composite jacking and supporting device may be provided which initially supports the suspension and the wheel to be balanced with the suspension in a compressed condition. After having effected such support with the wheel off the ground, a further means on the composite device can be operated to cause the additional transducing heads to be advanced to provide precise location of these heads against a part, such as the vehicle brake backplate which exerts cyclically varying forces in the horizontal plane as referred to above. Thereafter, switching can be effected by the operator in the electrical circuit to transfer at will from dynamic to static balancing sensing.

An alternative to the provision of a support device with a built-in transducer which holds the wheel to be balanced off the ground by supporting the vehicle suspension such as described with reference to FIG.6, is to provide a jacking system which comprises a pair of rollers which engage fore and aft of a wheel to be balanced whilst the wheel is on the ground. Such an alternative could include means for drawing the rollers together after so positioning them in order to lift the wheel from the ground and at the same time to provide, via the rollers, means for spinning the wheel up to the requisite speed for unbalanced sensing. In this case, transducers may be provided on the one hand for sensing vertical cyclically varying force loading on the rollers and on the other hand if desired, transducers for sensing horizontal cyclically varying forces due to "dynamic" unbalance. Here again, the circuits and position marking or indicating means may be such as described above. In another similar arrangement the wheel may rest upon an endless belt around a pair of rollers.

An arrangement such as proposed in these latter alternatives, can provide an advantage in that slight wheel eccentricities can be compensated for in the correction of unbalance.

Whilst various embodiments and manners of utilisation of these embodiments have been described in the foregoing, the invention is in no way restricted to such embodiments and further proposals based on the invention as defined by the claims may be readily apparent to persons skilled in wheel balancing techniques.

Having thus described our invention what we claim is:

1. In wheel balancing apparatus including testing means for testing a rotating wheel for unbalance, said testing means including support means for providing rigid vertical support for a wheel mounting carrying a rotatably mounted wheel to be tested, force transducer means for producing a cyclic electrical signal related to wheel unbalance and circuit means for producing, responsive to the cyclic signal, an output signal waveform having a predetermined phase relationship to the fundamental frequency of the wheel unbalance related cyclic signal, the improvement comprising sampling means, connected to receive said output signal waveform and responsive to the frequency thereof, for sampling the output signal waveform when the frequency thereof lies within a predetermined sampling frequency band so as to produce an unbalance related control signal for enabling balancing of the wheel.

2. Wheel balancing apparatus as claimed in claim 1 wherein said circuit means includes a tracking filter operable in response to a said unbalance-related cyclic signal to produce said output signal waveform.

3. Wheel balancing apparatus as claimed in claim 1, wherein said circuit means includes a phase-locked oscillator circuit operable in response to a said unbalance-related cyclic signal to produce said output signal waveform.

4. Wheel balancing apparatus as claimed in claim 3 wherein said output signal waveform is of rectangular wave-shape.

5. Wheel balancing apparatus as claimed in claim 3, including means operable in response to given transitions in said output signal waveform to produce a strobing pulse waveform.

6. Wheel balancing apparatus as claimed in claim 5, including means responsive to the strobing pulse waveform for enabling an indication of instantaneous wheel position to be given.

7. Wheel balancing apparatus as claimed in claim 6, said indication being presented by means of an electrical flasher circuit.

8. Wheel balancing apparatus as claimed in claim 3 inlcuding weight indicator means responsive to the magnitude of a said cyclic signal for providing an indication of amount of unbalance.

9. Apparatus as claimed in claim 5 wherein the sampling means is gated by the strobe pulse waveform.

10. Wheel balancing apparatus as claimed in claim 9, further including holding means for holding the unbalance indication while the wheel speed is out of a speed band corresponding to said predetermined frequency band.

11. Wheel balancing apparatus as claimed in claim 1 wherein said force means comprises a piezo-electric transducer.

12. Wheel balancing apparatus as claimed in claim 8 including means for inhibiting indications produced by said indicator means in response to the wheel unbalance related cyclic signal, when the magnitude of a said unbalance related cyclic signal is less than a given value.

13. Wheel balancing apparatus as claimed in claim 1 wherein said sampling means samples at a predetermined sampling frequency.

* * * * *